United States Patent
Meng et al.

(10) Patent No.: US 12,259,227 B2
(45) Date of Patent: Mar. 25, 2025

(54) METHOD FOR MONITORING LARGE DEFORMATION OF TUNNEL SURROUNDING ROCK BASED ON AUTOMATIC TARGET TRACKING AND RANGING SYSTEM

(71) Applicant: Chengdu University of Technology, Chengdu (CN)

(72) Inventors: Lubo Meng, Chengdu (CN); Junqi Fan, Chengdu (CN); Guosong Sun, Chengdu (CN); Fuli Kong, Chengdu (CN); Tianbin Li, Chengdu (CN); Xiaoyan Shi, Chengdu (CN); Wei Zhou, Chengdu (CN); Enlai Liu, Chengdu (CN); Xing Zhu, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 641 days.

(21) Appl. No.: 17/666,297

(22) Filed: Feb. 7, 2022

(65) Prior Publication Data
US 2022/0252387 A1 Aug. 11, 2022

(30) Foreign Application Priority Data
Feb. 7, 2021 (CN) .......................... 202110169574.1

(51) Int. Cl.
*G01C 3/08* (2006.01)
*E21F 17/00* (2006.01)
(Continued)

(52) U.S. Cl.
CPC .............. *G01B 11/16* (2013.01); *E21F 17/00* (2013.01); *G06T 7/73* (2017.01); *H04N 23/695* (2023.01);
(Continued)

(58) Field of Classification Search
CPC . G01B 11/16; G06T 7/73; G06T 2207/20084; G06T 2207/30181; E21F 17/00
See application file for complete search history.

(56) References Cited

U.S. PATENT DOCUMENTS

2020/0077051 A1    3/2020    Yu et al.

FOREIGN PATENT DOCUMENTS

| CN | 101458069 A | 6/2009 |
| CN | 101713691 A | 5/2010 |

(Continued)

OTHER PUBLICATIONS

Jiachheng Cai, et al., The automatic and real time measurement of tunnel surrounding rock deformation, Applied Mechanics and Materials, 2013, pp. 924-929, vols. 278-280.
(Continued)

*Primary Examiner* — Mark Hellner
(74) *Attorney, Agent, or Firm* — Bayramoglu Law Offices LLC

(57) ABSTRACT

A method for monitoring large deformation of a surrounding rock of a tunnel based on an automatic targeting and ranging system includes: acquiring, by a camera module, a target monitoring image; identifying a center image position in the target monitoring image; performing, by a laser ranging module, an automatic targeting and ranging task according to the center image position; and calculating a deformation offset of each target of left wall targets, right wall targets and a vault target based on an automatic targeting and ranging result corresponding to the target. The method solves the problem that a laser ranging device fails to measure a target at a fixed angle and obtains a real and accurate deformation offset thereby greatly improving the reliability of the large deformation monitoring result of the surrounding rock of the tunnel.

9 Claims, 7 Drawing Sheets

(51) Int. Cl.
  *G01B 11/16* (2006.01)
  *G06T 7/73* (2017.01)
  *H04N 23/695* (2023.01)
(52) U.S. Cl.
  CPC ............ *G06T 2207/20084* (2013.01); *G06T 2207/30181* (2013.01)

(56) References Cited

FOREIGN PATENT DOCUMENTS

| | | | | |
|---|---|---|---|---|
| CN | 102032891 | A | 4/2011 | |
| CN | 201811722 | U | 4/2011 | |
| CN | 104567712 | A | 4/2015 | |
| CN | 104777171 | A | 7/2015 | |
| CN | 105221187 | A | 1/2016 | |
| CN | 105783759 | A | 7/2016 | |
| CN | 106197304 | A | 12/2016 | |
| CN | 107655420 | A | 2/2018 | |
| CN | 108801170 | A | 11/2018 | |
| CN | 110345878 | A | 10/2019 | |
| CN | 110487195 | A * | 11/2019 | ............ G01B 11/10 |
| CN | 111623750 | A | 9/2020 | |
| CN | 111750798 | A | 10/2020 | |
| CN | 112229375 | A * | 1/2021 | ............ G01B 11/30 |
| CN | 212409636 | U | 1/2021 | |
| JP | 2002156229 | A | 5/2002 | |
| JP | 2004012152 | A | 1/2004 | |
| JP | 2004037247 | A | 2/2004 | |
| JP | 3198160 | U * | 6/2015 | ............ G01C 7/06 |
| KR | 20040108382 | A | 12/2004 | |
| KR | 20200082818 | A | 7/2020 | |

OTHER PUBLICATIONS

Lu Nannan, et al., Research on informatization technology for roadway surrounding rock structure monitoring in deep underground, Industry and Mine Automation, 2019, pp. 1-9, vol. 45 No. 6.

* cited by examiner

METHOD FOR MONITORING LARGE DEFORMATION OF TUNNEL SURROUNDING ROCK BASED ON AUTOMATIC TARGET TRACKING AND RANGING SYSTEM

CROSS REFERENCE TO THE RELATED APPLICATIONS

This application is based upon and claims priority to Chinese Patent Application No. 202110169574.1, filed on Feb. 7, 2021, the entire contents of which are incorporated herein by reference.

TECHNICAL FIELD

The present invention belongs to the technical field of tunnel engineering, and more particularly, relates to a method for monitoring large deformation of a surrounding rock of a tunnel based on an automatic targeting and ranging system.

BACKGROUND

As China's tunnel construction continues to set world records in terms of length and mileage, tunnel construction safety issues, especially the large deformation of the surrounding rock that mostly occurs in tunnels with large, buried depths and high in-situ stress, have received increasing attention. The large deformation of the surrounding rock of the tunnel as a plastic flow deformation is an extreme plastic failure occurring under high ground stress and has a great impact on the normal construction of the tunnel project.

In the existing automatic monitoring technology of laser ranging for large deformation of the surrounding rock of tunnels, a laser ranging device at a mounting position periodically obtains results of laser ranging from the laser ranging device to a target arranged on a tunnel wall, and the large deformation of the surrounding rock of the tunnel is monitored based on the results of laser ranging. Due to the long duration, fast rate, and wide range of damage of the large deformation of the surrounding rock of the tunnel, the target will deviate from the initial position after a period of time. As a result, the laser ranging device will fail to measure the target at a fixed angle, resulting in large errors in the measurement data, thereby affecting the reliability of the monitoring results of the large deformation of the surrounding rock of the tunnel. In addition, the existing deformation calculation method assumes that the mounting position of the laser ranging device is a non-deforming point, which cannot reflect the real deformation, but further leads to errors in the measurement data.

SUMMARY

An objective of the present invention is to provide a method for monitoring large deformation of a surrounding rock of a tunnel based on an automatic targeting and ranging system. The present invention solves the problems of large measurement data errors and unreliable monitoring results in the existing automatic monitoring technology of laser ranging for large deformation of a surrounding rock of tunnels. The method includes: acquiring, by a camera module, a target monitoring image; identifying a center image position in the target monitoring image; performing, by a laser ranging module, an automatic targeting and ranging task according to the center image position; and calculating a deformation offset of each target of left wall targets, right wall targets and a vault target based on an automatic targeting and ranging result corresponding to the target. The present invention solves the problem that a laser ranging device fails to measure a target at a fixed angle, and obtains a real and accurate deformation offset, greatly improving the reliability of the large deformation monitoring result of the surrounding rock of the tunnel.

The present invention provides a method for monitoring large deformation of a surrounding rock of a tunnel based on an automatic targeting and ranging system, where the automatic targeting and ranging system includes a left camera module, a left laser ranging module, left wall targets, a right camera module, a right laser ranging module, right wall targets and a vault target; the left camera module and the left laser ranging module are bound on a left side wall of a cross section of the tunnel and are rotatable counterclockwise synchronously on the cross section of the tunnel; there are a plurality of left wall targets spaced apart on a left wall of the cross section of the tunnel; the right camera module and the right laser ranging module are bound on a right side wall of the cross section of the tunnel and are rotatable synchronously clockwise on the cross section of the tunnel; there are a plurality of right wall targets spaced apart on a right wall of the cross section of the tunnel; and the vault target is provided at a vault position of the cross section of the tunnel.

The method for monitoring the large deformation of the surrounding rock of the tunnel includes an automatic targeting and ranging stage and a tunnel deformation calculation stage.

For each target of the left wall targets, the right wall targets and the vault target, the automatic targeting and ranging stage includes the following steps:

rotating a camera module and a laser ranging module corresponding to a target from a horizontal position, where the camera module is the right camera module corresponding to the left wall targets or the vault target, and the laser ranging module is the right laser ranging module corresponding to the left wall targets or the vault target; alternatively, the camera module is the left camera module corresponding to the right wall targets or the vault target, and the laser ranging module is the left laser ranging module corresponding to the right wall targets or the vault target;

when rotating to an initial target alignment angle corresponding to the target, acquiring, by the camera module, a target monitoring image including a target image, where the initial target alignment angle refers to a rotation angle of rotating the laser ranging module from the horizontal position to allow the laser ranging module to be aligned with the target when the target is arranged;

determining a center image position of the target in the target monitoring image;

adjusting rotation angles of the camera module and the laser ranging module according to the center image position, to allow the laser ranging module to be aligned with the target;

calculating a current target alignment angle according to the initial target alignment angle and adjusted rotation angles; and acquiring, by the laser ranging module, a current distance value from the laser ranging module to the target.

The tunnel deformation calculation stage includes: calculating a deformation offset of each target of the left wall targets, the right wall targets and the vault target according to the current target alignment angle, the current distance value, the initial target alignment angle and an initial distance value corresponding to the target, where the initial distance value refers to a distance value from the laser ranging module to the target first acquired by the laser ranging module in an alignment attitude when the target is arranged.

Based on the above content, the present invention provides a solution for monitoring large deformation of a surrounding rock of a tunnel based on an automatic targeting and ranging system. The solution includes: acquiring, by a camera module, a target monitoring image; identifying a center image position in the target monitoring image; performing, by a laser ranging module, an automatic targeting and ranging task according to the center image position; and calculating a deformation offset of each target of left wall targets, right wall targets and a vault target based on an automatic targeting and ranging result corresponding to the target. The present invention solves the problem that a laser ranging device fails to measure a target at a fixed angle, and obtains a real and accurate deformation offset, greatly improving the reliability of the large deformation monitoring result of the surrounding rock of the tunnel.

In a possible design, the step of determining the center image position of the target in the target monitoring image may include:
  scaling the target monitoring image to a size suitable to be input into a convolutional neural network (CNN);
  inputting the scaled target monitoring image into the CNN, and extracting feature information of the target monitoring image through an interaction of a convolutional layer, a pooling layer and an activation function of the CNN;
  transmitting the feature information to a region proposal network (RPN), preliminarily positioning a target image feature through the RPN, and generating a candidate identification region including the target image;
  transmitting the candidate identification region and the feature information to a region of interest (ROI) pooling layer, and extracting feature information in the candidate identification region through the ROI pooling layer; and
  inputting the feature information in the candidate identification region into a fully connected layer, and positioning a center image through the fully connected layer to obtain the center image position.

In a possible design, after scaling the target monitoring image to the size suitable to be input into the CNN, the method may further include:
  uploading the scaled target monitoring image to a cloud server; and
  processing, by the cloud server, the scaled target monitoring image sequentially through the CNN, the RPN, the ROI pooling layer and the fully connected layer to obtain the center image position.

In a possible design, the step of calculating the deformation offset of each target of the left wall targets, the right wall targets and the vault target according to the current target alignment angle, the current distance value, the initial target alignment angle and the initial distance value corresponding to the target may include:
  calculating the deformation offset FF' of each target as follows:

$$FF' = \sqrt{((d_0 * \cos\theta_0 - d_{v,0} * \cos\theta_{v,0}) - (d_\tau * \cos\theta_\tau - d_{v,\tau} * \cos\theta_{v,\tau}))^2 + ((d_0 * \sin\theta_0) - (d_\tau * \sin\theta_\tau))^2}$$

where, $d_0$ denotes the initial distance value corresponding to the target; $\theta_0$ denotes the initial target alignment angle corresponding to the target; $d_{v,0}$ denotes an initial distance value corresponding to the vault target; $\theta_{v,0}$ denotes an initial target alignment angle corresponding to the vault target; $d_\tau$ denotes the current distance value corresponding to the target; $\theta_\tau$ denotes the current target alignment angle corresponding to the target; $d_{v,\tau}$ denotes a current distance value corresponding to the vault target; and $\theta_{v,\tau}$ denotes a current target alignment angle corresponding to the vault target.

In a possible design, after calculating the deformation offset of each target, the method may further include:
  calculating a vault subsidence $\Delta H$ and a perimeter convergence $\Delta L$ as follows:

$$\begin{cases} \Delta H = (FF'_{v,left} + FF'_{v,right})/2 \\ \Delta L = FF'_{left,sw} + FF'_{right,sw} \end{cases}$$

where, $FF'_{v,left}$ denotes a deformation offset corresponding to the vault target, calculated based on an automatic targeting and ranging result of the left laser ranging module; $FF'_{v,right}$ denotes a deformation offset corresponding to the vault target, calculated based on an automatic targeting and ranging result of the right laser ranging module; $FF'_{left,sw}$ denotes a deformation offset corresponding to a left wall target arranged on the left side wall; and $FF'_{right,sw}$ denotes a deformation offset corresponding to a right wall target arranged on the right side wall.

In a possible design, the tunnel deformation calculation stage may further include: calculating a vault subsidence and a perimeter convergence based on a current target alignment angle, a current distance value, an initial target alignment angle and an initial distance value corresponding to the vault target.

In a possible design, the step of calculating the vault subsidence and the perimeter convergence based on the current target alignment angle, the current distance value, the initial target alignment angle and the initial distance value corresponding to the vault target may include:
  calculating the vault subsidence $\Delta H$ and the perimeter convergence $\Delta L$ as follows:

$$\begin{cases} \Delta H = ((d_{v,0,left} * \sin\theta_{v,0,left}) - (d_{v,\tau,left} * \sin\theta_{v,\tau,left}) + \\ \quad (d_{v,0,right} * \sin\theta_{v,0,right}) - (d_{v,\tau,right} * \sin\theta_{v,\tau,right}))/2 \\ \Delta L = (d_{v,0,left} * \cos\theta_{v,0,left}) - (d_{v,\tau,left} * \cos\theta_{v,\tau,left}) + \\ \quad (d_{v,0,right} * \cos\theta_{v,0,right}) - (d_{v,\tau,right} * \cos\theta_{v,\tau,right}) \end{cases},$$

where, $d_{v,0,left}$ denotes an initial distance value corresponding to the vault target, calculated based on an automatic targeting and ranging result of the left laser ranging module;

$\theta_{v,0,left}$ denotes an initial target alignment angle corresponding to the vault target, calculated based on the automatic targeting and ranging result of the left laser ranging module; $d_{v,\tau,left}$ denotes a current distance value corresponding to the vault target, calculated based on the automatic targeting and ranging result of the left laser ranging module; $\theta_{v,\tau,left}$ denotes a current target alignment angle corresponding to the vault target, calculated based on the automatic targeting and ranging result of the left laser ranging module; $d_{v,0,right}$ denotes an initial distance value corresponding to the vault target, calculated based on an automatic targeting and ranging result of the right laser ranging module; $\theta_{v,0,right}$ denotes an initial target alignment angle corresponding to the vault target, calculated based on the automatic targeting and ranging result of the right laser ranging module; $d_{v,\tau,right}$ denotes a current distance value corresponding to the vault target, calculated based on the automatic targeting and ranging result of the right laser ranging module; and $\theta_{v,\tau,right}$ denotes a current target alignment angle corresponding to the vault target, calculated based on the automatic targeting and ranging result of the right laser ranging module.

In a possible design, after calculating the deformation offset of each target, the method may further include:

obtaining a contour deformation map of the tunnel for reflecting the large deformation of the surrounding rock of the tunnel by fitting based on deformation offsets corresponding to the vault target, all the left wall targets and all the right wall targets.

In a possible design, the automatic targeting and ranging system may further include a control board, a left servo motor and a right servo motor; and the control board may communicate with output ends of the left camera module, the left laser ranging module, the right camera module and the right laser ranging module, respectively;

the left servo motor may be arranged on the left side wall of the cross section of the tunnel, and may communicate with the control board, so as to drive, under the control of the control board, the left camera module and the left laser ranging module to rotate synchronously counterclockwise on the cross section of the tunnel; and the right servo motor may be arranged on the right side wall of the cross section of the tunnel, and may communicate with the control board, so as to drive, under the control of the control board, the right camera module and the right laser ranging module to rotate synchronously clockwise on the cross section of the tunnel.

In a possible design, each of the left wall targets, the right wall targets and the vault target may adopt a reflective sheet with a square structure; and a green luminous paint layer may be coated on a reflective surface of the reflective sheet, and a center position of the luminous paint layer may be provided with a circular reflective surface exposure hole.

The present invention has the following beneficial effects:

(1) The present invention provides a solution for monitoring large deformation of a surrounding rock of a tunnel based on an automatic targeting and ranging system. The solution includes: acquiring, by a camera module, a target monitoring image; identifying a center image position in the target monitoring image; performing, by a laser ranging module, an automatic targeting and ranging task according to the center image position; and calculating a deformation offset of each target of left wall targets, right wall targets and a vault target based on an automatic targeting and ranging result corresponding to the target. The present invention solves the problem that a laser ranging device fails to measure a target at a fixed angle, and obtains a real and accurate deformation offset, greatly improving the reliability of the large deformation monitoring result of the surrounding rock of the tunnel.

(2) In the calculation of the deformation offset of the target, the present invention substitutes deformation offsets of opposite side walls to compensate for the mounting position of the laser ranging device, which is a deforming point. Therefore, the present invention can obtain a real and accurate deformation offset, thereby improving the reliability of the large deformation monitoring result of the surrounding rock of the tunnel.

BRIEF DESCRIPTION OF THE DRAWINGS

To describe the technical solutions in the embodiments of the present invention or in the prior art more clearly, the following briefly describes the drawings required for describing the embodiments or the prior art. Apparently, the drawings in the following description show merely some embodiments of the present invention, and a person of ordinary skill in the art may still derive other drawings from these drawings without creative efforts.

Figure 1:
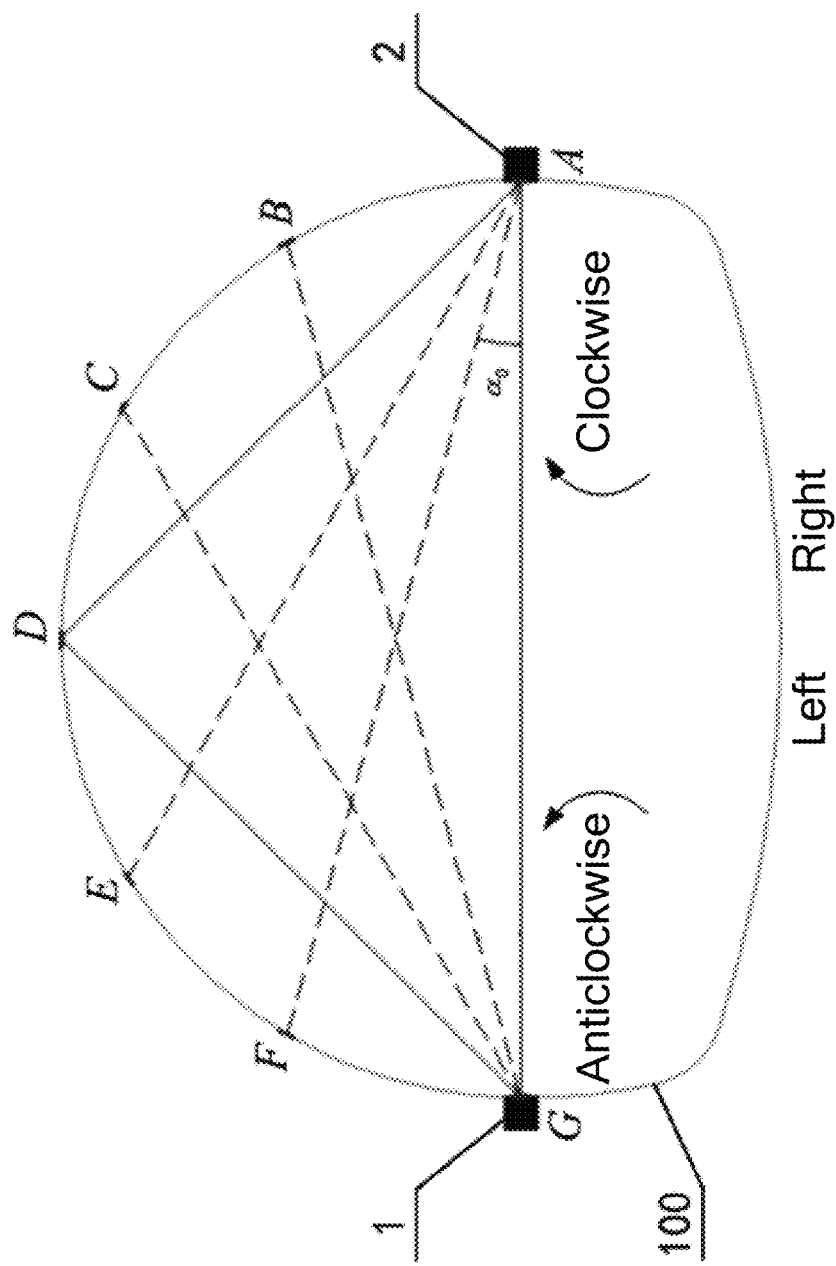
FIG. 1 is a schematic view of an automatic targeting and ranging system arranged on a cross section of a tunnel according to the present invention.
Figure 2:
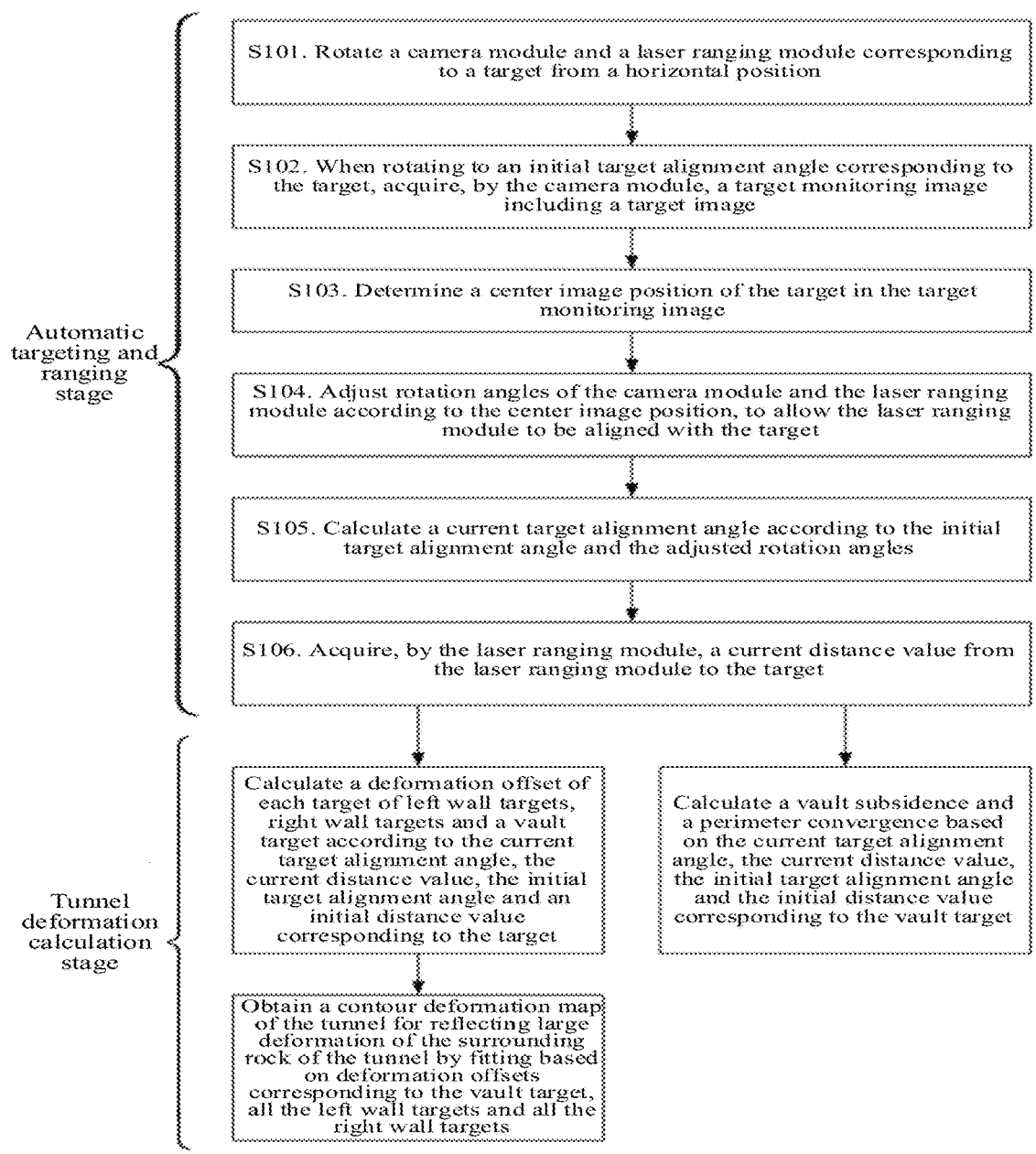
FIG. 2 is a flowchart of a method for monitoring large deformation of a surrounding rock of a tunnel according to the present invention.

Reference Numerals: 1. left laser ranging module; 2. right laser ranging module; 3. target; 31. luminous paint layer; 32. reflective surface exposure hole; 100. cross section of tunnel; 200. target monitoring image; 201. target image; 202. candidate identification region; and 203. center image.

DETAILED DESCRIPTION OF THE EMBODIMENTS

The present invention is described in further detail below with reference to the drawings and specific embodiments. It should be noted here that the description of these embodiments is intended to help understand the present invention, rather than to limit the present invention. The specific structural and functional details disclosed herein are only used to describe illustrative embodiments of the present invention. However, the present invention may be embodied in many alternative forms, but it does not mean that the present invention is limited to the embodiments set forth herein.

It should be understood that although the terms such as "first" and "second" may be used herein to describe various units, these units are not limited by these terms. These terms are only used to distinguish one unit from another. For example, a first unit may be referred to as a second unit, and a second unit may be referred to as a first unit similarly, without departing from the scope of the illustrative embodiments of the present invention.

It should be understood that the term "and/or" used herein only refers to an association relationship for describing associated objects and denotes that there may be three relationships. For example, A and/or B may represent the following three cases: there is A alone; there is B alone; and there are both A and B. The term "/and" used herein refers to another relationship between associated objects and denotes that there may be two relationships. For example, A/and B may represent the following two cases: there is A alone, and there are both A and B. In addition, the character "/" used herein generally indicates an "or" relationship between the associated objects before and after the character.

It should be understood that when it is mentioned herein that a unit is "connected with", "connected to", or "coupled with" another unit, the unit may be connected or coupled to another unit directly or through an intermediate unit. In contrast, when it is mentioned herein that a unit is "directly connected" or "directly coupled" to another unit, there is no intermediate unit. Other words used to describe relationships among units should be interpreted in a similar way (for example, "between" vs "directly between", "adjacent" vs "directly adjacent", etc.).

The terms used herein are only used to describe specific embodiments and are not intended to limit illustrative embodiments of the present invention. Unless otherwise clearly indicated in the context, the singular forms "a", "an", and "the" used herein are intended to include plural forms. It should also be understood that the terms "include", "includes", "comprises", and/or "comprises", when used herein, specify the existence of the stated features, quantities, steps, operations, units and/or components, which do not exclude the existence or addition of one or more other features, quantities, steps, operations, units and components, and/or combinations thereof.

It should also be noted that, in some alternative and possible designs, the functions/actions may appear in an order different from those shown in the figures. For example, some involved functions/actions may actually be executed substantially concurrently, or sometimes two figures shown in succession may be executed in a reverse order.

It should be understood that specific details are provided in the following description to facilitate a complete understanding of the illustrative embodiments. However, those of ordinary skill in the art should understand that the illustrative embodiments may be implemented without these specific details. For example, the system may be shown in a block diagram to avoid the problem that an embodiment is illustrated unclearly due to unnecessary details. In other embodiments, well-known procedures, structures, and technologies may not be shown in unnecessary details to avoid making the illustrative embodiments unclear.

In an embodiment of the present invention, an automatic targeting and ranging system may include, but is not limited to, a left camera module, a left laser ranging module, left wall targets, a right camera module, a right laser ranging module, right wall targets and a vault target; the left camera module and the left laser ranging module are bound on a left side wall of a cross section of the tunnel and are rotatable counterclockwise synchronously on the cross section of the tunnel; there are a plurality of left wall targets spaced apart on a left wall of the cross section of the tunnel; the right camera module and the right laser ranging module are bound on a right side wall of the cross section of the tunnel and are rotatable synchronously clockwise on the cross section of the tunnel; there are a plurality of right wall targets spaced apart on a right wall of the cross section of the tunnel; and the vault target is provided at a vault position of the cross section of the tunnel.

As shown in FIG. 1, the left camera module (not shown in the figure) and the left laser ranging module 1 are bound at a left side wall position G of the cross section 100 of the tunnel. The left wall targets are evenly spaced apart (of course, they may also be unequally spaced) at a left wall position G (that is, the left side wall position G), a left wall position F and a left wall position E of the cross section 100 of the tunnel. The vault target is provided at a vault position D of the cross section 100 of the tunnel. The right wall targets are evenly spaced apart (of course, they may also be unequally spaced) at a right wall position C, a right wall position B and a right wall position A (that is, the right side wall position A) of the cross section 100 of the tunnel. The right camera module (not shown in the figure) and the right laser ranging module 2 are bound at the right side wall position A of the cross section 100 of the tunnel.

In the automatic targeting and ranging system, the left camera module is used to acquire the target monitoring images of the right wall targets and the vault target, and an existing camera device may be used. The left laser ranging module 1 is used to acquire the distance values from the left laser ranging module to the right wall targets and the vault target, and an existing laser ranging device may be used. The right camera module is used to acquire the target monitoring images of the left wall targets and the vault target, and an existing camera device may be used. The right laser ranging module 2 is used to acquire the distance values from the right laser ranging module to the left wall targets and the vault target, and an existing laser ranging device may be used. Preferably, in order to facilitate the laser ranging module to perform an automatic targeting and ranging task, the automatic targeting and ranging system further includes a control board, a left servo motor and a right servo motor; and the control board communicates with output ends of the left camera module, the left laser ranging module, the right camera module and the right laser ranging module, respectively. The left servo motor is arranged on the left side wall of the cross section of the tunnel, and communicates with the control board, so as to drive, under the control of the control board, the left camera module and the left laser ranging module to rotate synchronously counterclockwise on the cross section of the tunnel. The right servo motor is arranged on the right side wall of the cross section of the tunnel, and communicates with the control board, so as to drive, under the control of the control board, the right camera module and the right laser ranging module to rotate synchronously clockwise on the cross section of the tunnel. The control board (not shown in the figure) may be a main board of an existing single-chip microcomputer (SCM). The left servo motor (not shown in the figure) and the right servo motor (not shown in the figure) may be existing servo motors. Further, two control boards may be arranged. One control board communicates with the left camera module, the left laser ranging module and the left servo motor, and the other control board communicates with the right camera module, the right laser ranging module and the right servo motor.

As shown in FIGS. 2 to 8, the method for monitoring large deformation of a surrounding rock of a tunnel based on the automatic targeting and ranging system may include, but is not limited to, an automatic targeting and ranging stage and a tunnel deformation calculation stage, and the control board executes all or part of the steps.

The automatic targeting and ranging stage includes, but is not limited to, the following steps S101 to S106 for each target of the left wall targets, the right wall targets and the vault target.

S101. Rotate the camera module and the laser ranging module corresponding to the target from a horizontal position, where the camera module is the right camera module corresponding to the left wall targets or the vault target, and the laser ranging module is the right laser ranging module corresponding to the left wall targets or the vault target; alternatively, the camera module is the left camera module corresponding to the right wall targets or the vault target, and the laser ranging module is the left laser ranging module corresponding to the right wall targets or the vault target.

In step S101, specifically, for the left wall targets or the vault target, the right camera module and the right laser ranging module are rotated clockwise from a horizontal position. For the right wall targets or the vault target, the left camera module and the left laser ranging module are rotated clockwise from a horizontal position.

S102. When rotating to an initial target alignment angle corresponding to the target, acquire, by the camera module, a target monitoring image including a target image, where the initial target alignment angle refers to a rotation angle of rotating the laser ranging module from the horizontal position to allow the laser ranging module to be aligned with the target when the target is arranged.

Figure 3:
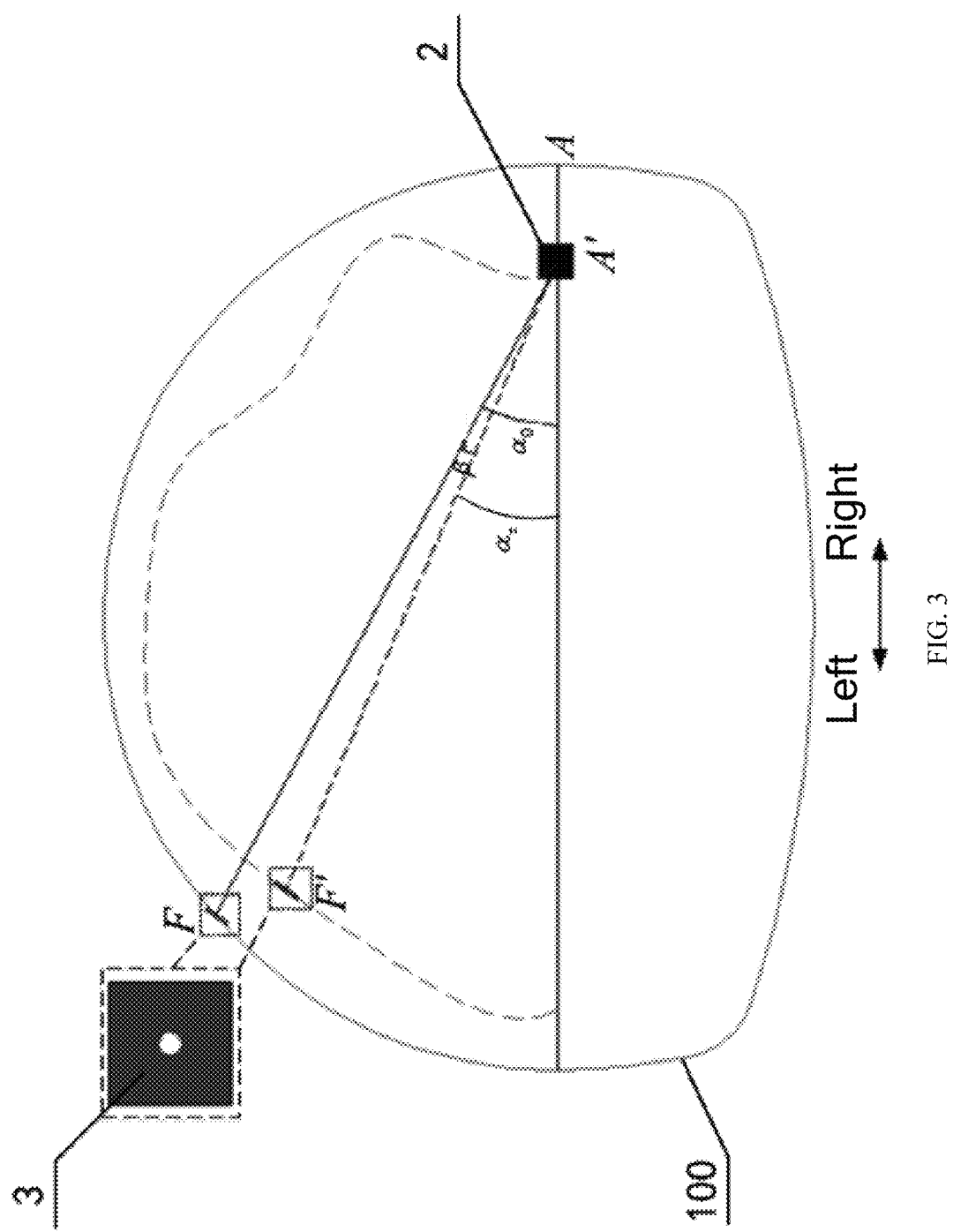
FIG. 3 is a schematic view of targeting and ranging on the cross section of the tunnel according to the present invention.

In step S102, for example, as shown in FIG. 3, for the left wall target provided at the left wall position F of the cross section 100 of the tunnel, the initial target alignment angle is denoted by $\alpha_0$. After the right camera module and the right laser ranging module are rotated by an angle $\alpha_0$ from the horizontal position, the lens of the right camera module and the right laser ranging module are roughly aligned with the left wall target. This design prevents the target from falling out of the field of view of the camera module, such that the camera module can acquire a target monitoring image including a target image.

S103. Determine a center image position of the target in the target monitoring image.

Figure 4:
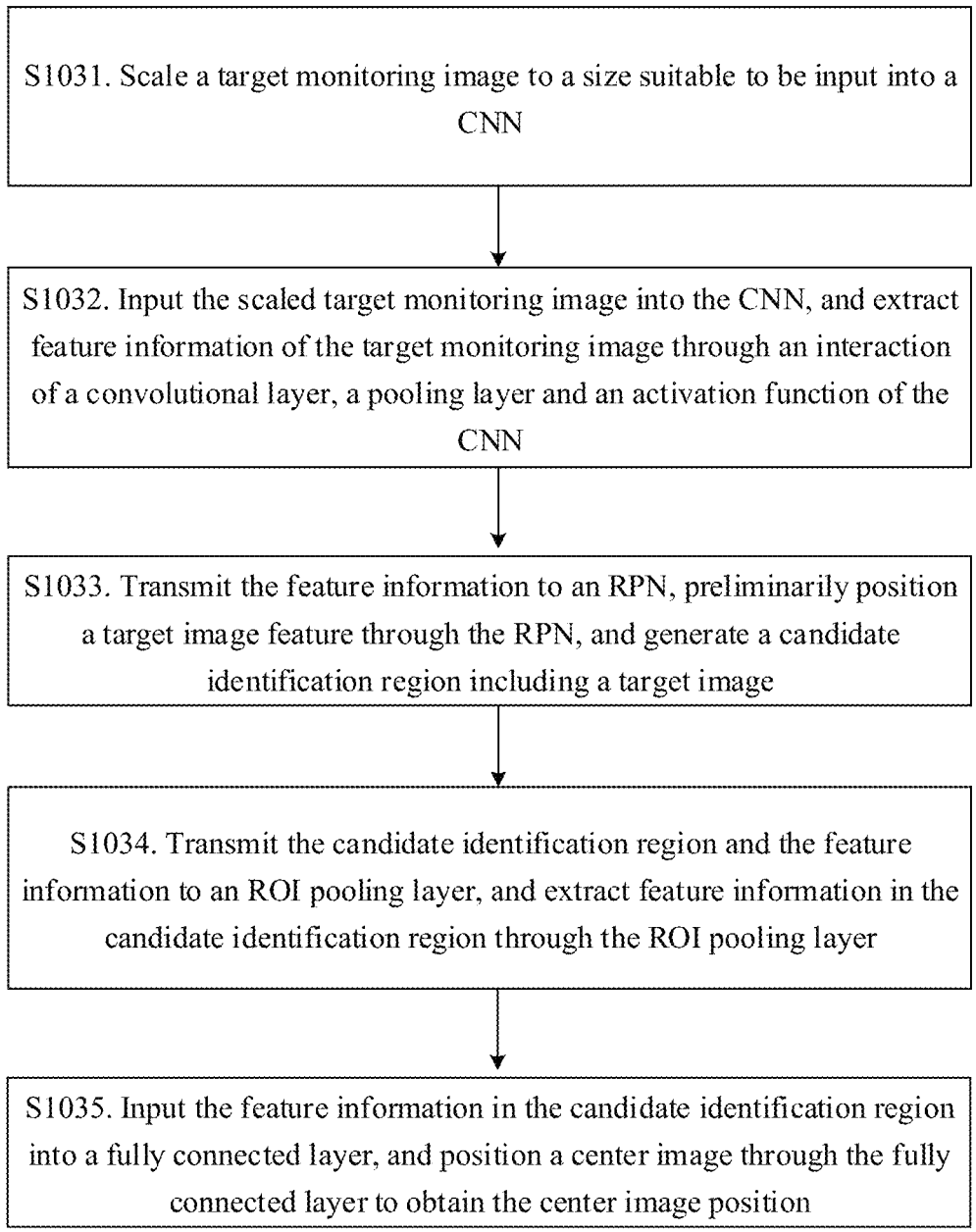
FIG. 4 is a flowchart of determining a center image position based on a faster region-based convolutional neural network (Faster-R-CNN) according to the present invention.
Figure 5:
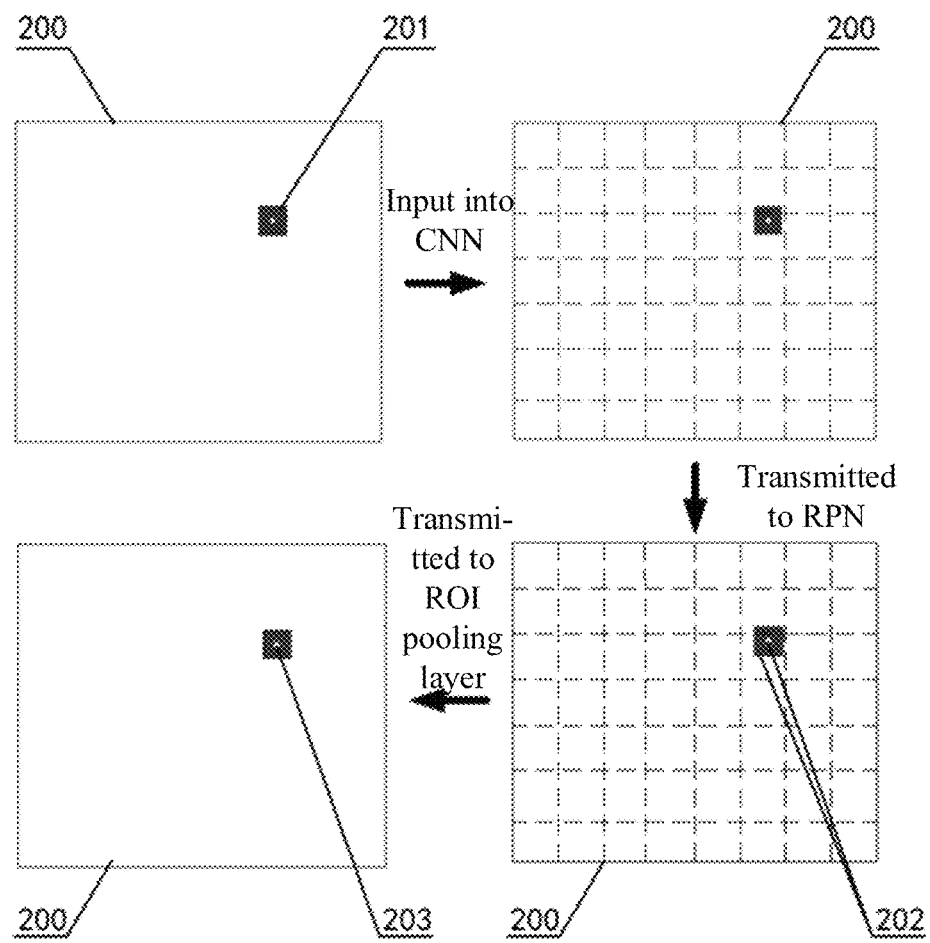
FIG. 5 is a schematic view of processing a target monitoring image sequentially during a positioning process according to the present invention.

Step S103 may, but is not limited to, identify the target monitoring image through an existing Faster-R-CNN, and acquire a center image position. That is, as shown in FIGS. 4 to 5, the center image position of the target is determined in the target monitoring image, including but not limited to the following steps S1031 to S1035.

S1031. Scale the target monitoring image to a size suitable to be input into a CNN.

S1032. Input the scaled target monitoring image into the CNN, and extract feature information of the target monitoring image through an interaction of a convolutional layer, a pooling layer and an activation function of the CNN.

S1033. Transmit the feature information to a region proposal network (RPN), preliminarily position a target image feature through the RPN, and generate a candidate identification region including the target image.

S1034. Transmit the candidate identification region and the feature information to a region of interest (ROI) pooling layer, and extract feature information in the candidate identification region through the ROI pooling layer.

S1035. Input the feature information in the candidate identification region into a fully connected layer, and position a center image through the fully connected layer to obtain the center image position.

In steps S1031 to S1035, the specific technical details, such as image scaling, feature extraction based on the CNN, RPN-based candidate identification region generation, feature extraction based on the ROI pooling layer (that is, to reflect the candidate identification region on a feature map generated by the CNN) and the positioning based on the fully connected layer, may be achieved by routine improvements on the existing technical means. In addition, there are various activation functions, such as sigmoid, tanh and rectified linear unit (ReLU). The embodiment prefers the sigmoid function, which is expressed as:

$$f_{(x)} = \frac{1}{1+e^{-x}}.$$

In step S103, further considering that the processing capability of the control board is limited, steps S1032 to S1035 may be handed over to a cloud server for execution, so as to quickly obtain the positioning result fed back by the cloud server. That is, after scaling the target monitoring image to the size suitable to be input into the CNN, the method further includes: upload the scaled target monitoring image to a cloud server; and process, by the cloud server, the scaled target monitoring image sequentially through the CNN, the RPN, the ROI pooling layer and the fully connected layer to obtain the center image position.

Figure 6:
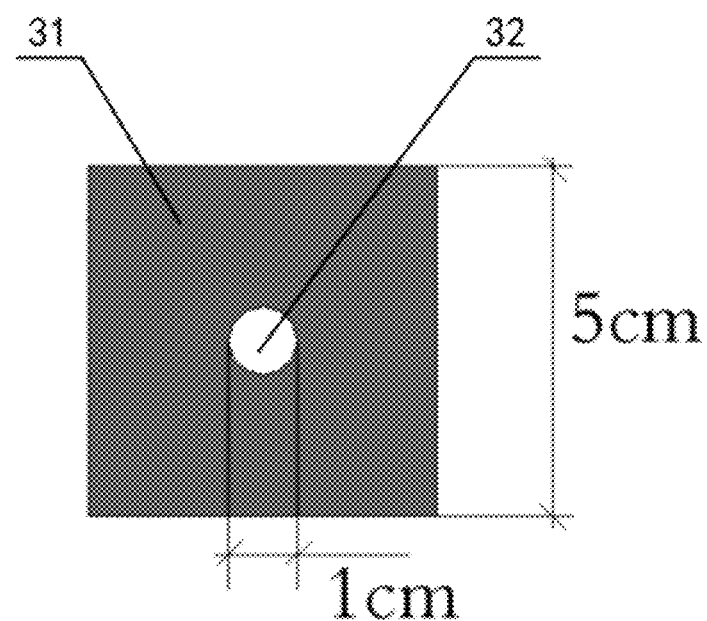
FIG. 6 is a front view of a target according to the present invention.

In step S103, in order to determine the center image position of the target in the target monitoring image, the center of the target needs to have an obvious image feature. Therefore, preferably, each of the left wall targets, the right wall targets and the vault target adopts a reflective sheet with a square structure. A green luminous paint layer 31 is coated on a reflective surface of the reflective sheet, and a center position of the luminous paint layer 31 is provided with a circular reflective surface exposure hole 32. As shown in FIG. 6, since the luminous paint can emit light in a dark environment, this target structure design is suitable for imaging the target and the center of the target through the camera module in the tunnel environment, so as to acquire high-quality target monitoring images. In addition, specifically, the size of the reflective sheet may be, for example, 5 cm*5 cm, and the diameter of the reflective surface exposure hole 32 may be, for example, 1 cm.

S104. Adjust rotation angles of the camera module and the laser ranging module according to the center image position, to allow the laser ranging module to be aligned with the target.

In step S104, specifically, the rotation angle that needs to be adjusted to allow the laser ranging module to be aligned with the target is calculated based on a conventional geometric algorithm. Then, the rotation angles of the camera module and the laser ranging module are directly fine-tuned according to the calculation results, so as to complete the automatic targeting task. As shown in FIG. 3, the left wall position F is deviated to a new position F' due to the large deformation of the surrounding rock of the tunnel. Thus, it is necessary to fine-tune the rotation angle $\beta$ counterclockwise to precisely align the laser ranging module with the target.

S105. Calculate a current target alignment angle according to the initial target alignment angle and adjusted rotation angles.

In step S105, as shown in FIG. 3, for example, for the left wall target provided at the left wall position F of the cross section 100 of the tunnel, the current target alignment angle is denoted by $\alpha_\tau$, $\alpha_\tau=\alpha_0-\beta$ (or $\alpha_\tau=\alpha_0+\beta$ when the rotation angle $\beta$ is fine-tuned clockwise).

S106. Acquire, by the laser ranging module, a current distance value from the laser ranging module to the target.

In the automatic targeting and ranging stage, for each target of the left wall targets and the vault target, the right camera module and the right laser ranging module may be rotated clockwise, and the corresponding current target alignment angles and current distance values are sequentially obtained through steps S101 to S106. That is, in the clockwise direction, after completing the automatic targeting and ranging task for one target, they are rotated clockwise to perform automatic targeting and ranging for the next target. When completing the automatic targeting and ranging task for the vault target, the right camera module and the right laser ranging module are rotated to return to the horizontal position, so as to re-start a round of automatic targeting and ranging task for the left wall targets and the vault target at the next measurement moment. Similarly, for each target of the right wall targets and the vault target, the left camera module and the left laser ranging module may be rotated counterclockwise, and the corresponding current target alignment angles and current distance values are sequentially obtained through steps S101 to S106. That is, in the counterclockwise direction, after completing the automatic targeting and ranging task for one target, they are rotated counterclockwise to perform automatic targeting and ranging for the next target. When the automatic targeting and ranging task for the vault target is completed, the left camera module and the left laser ranging module are rotated to return to the horizontal position, so as to re-start a round of automatic targeting and ranging task for the right wall targets and the vault target at the next measurement moment. In addition, in order to quickly and automatically target and range, the right camera module and the right laser ranging module are synchronously rotated clockwise or the left camera module and the left laser ranging module are synchronously rotated counterclockwise to complete the automatic targeting and ranging task for all targets.

The tunnel deformation calculation stage includes, but is not limited to: calculate a deformation offset of each target of the left wall targets, the right wall targets and the vault target according to the current target alignment angle, the current distance value, the initial target alignment angle and an initial distance value corresponding to the target, where the initial distance value refers to a distance value from the laser ranging module to the target first acquired by the laser ranging module in an alignment attitude when the target is arranged.

Figure 7:
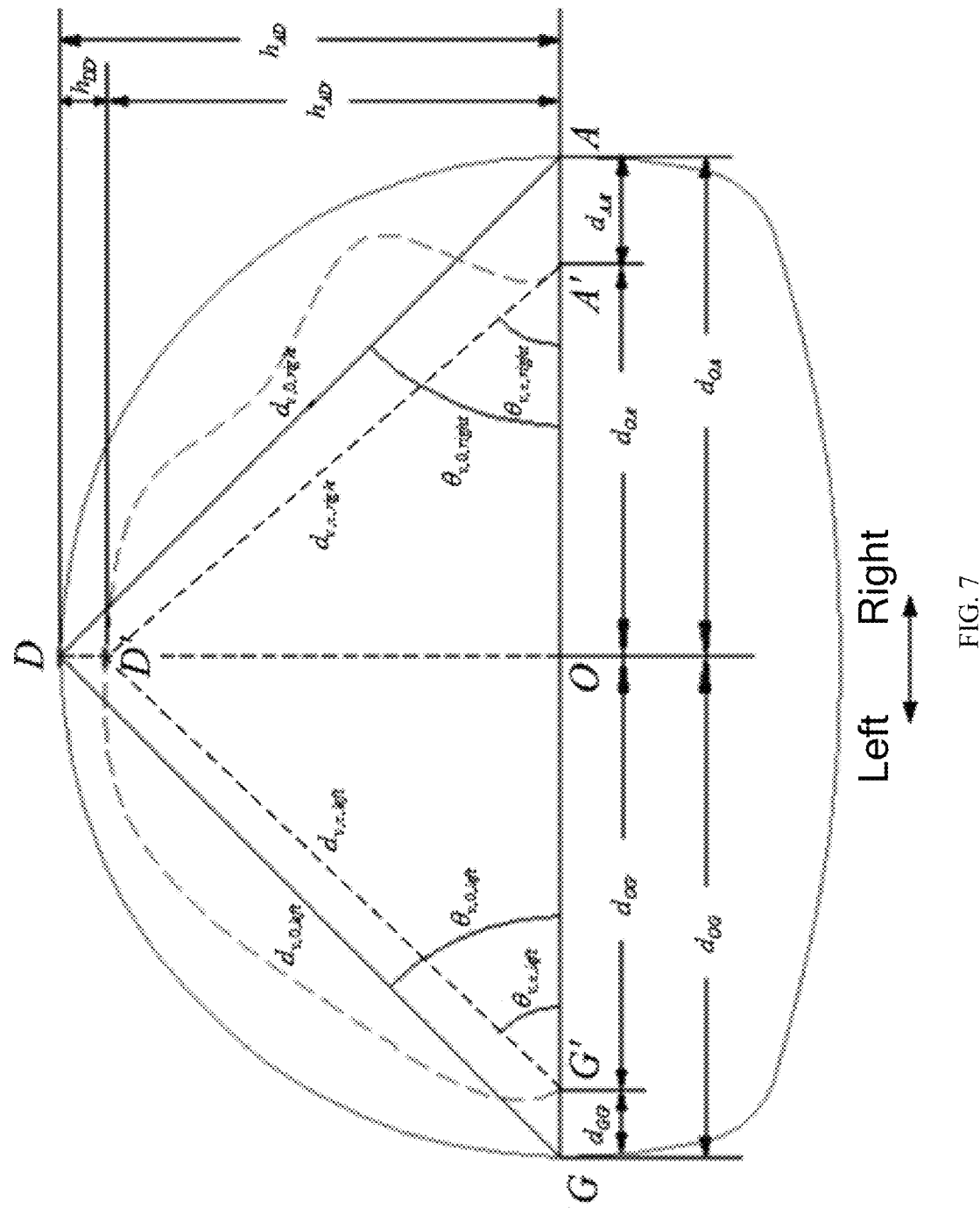
FIG. 7 is a schematic view of calculating a vault subsidence and a perimeter convergence according to the present invention.
Figure 8:
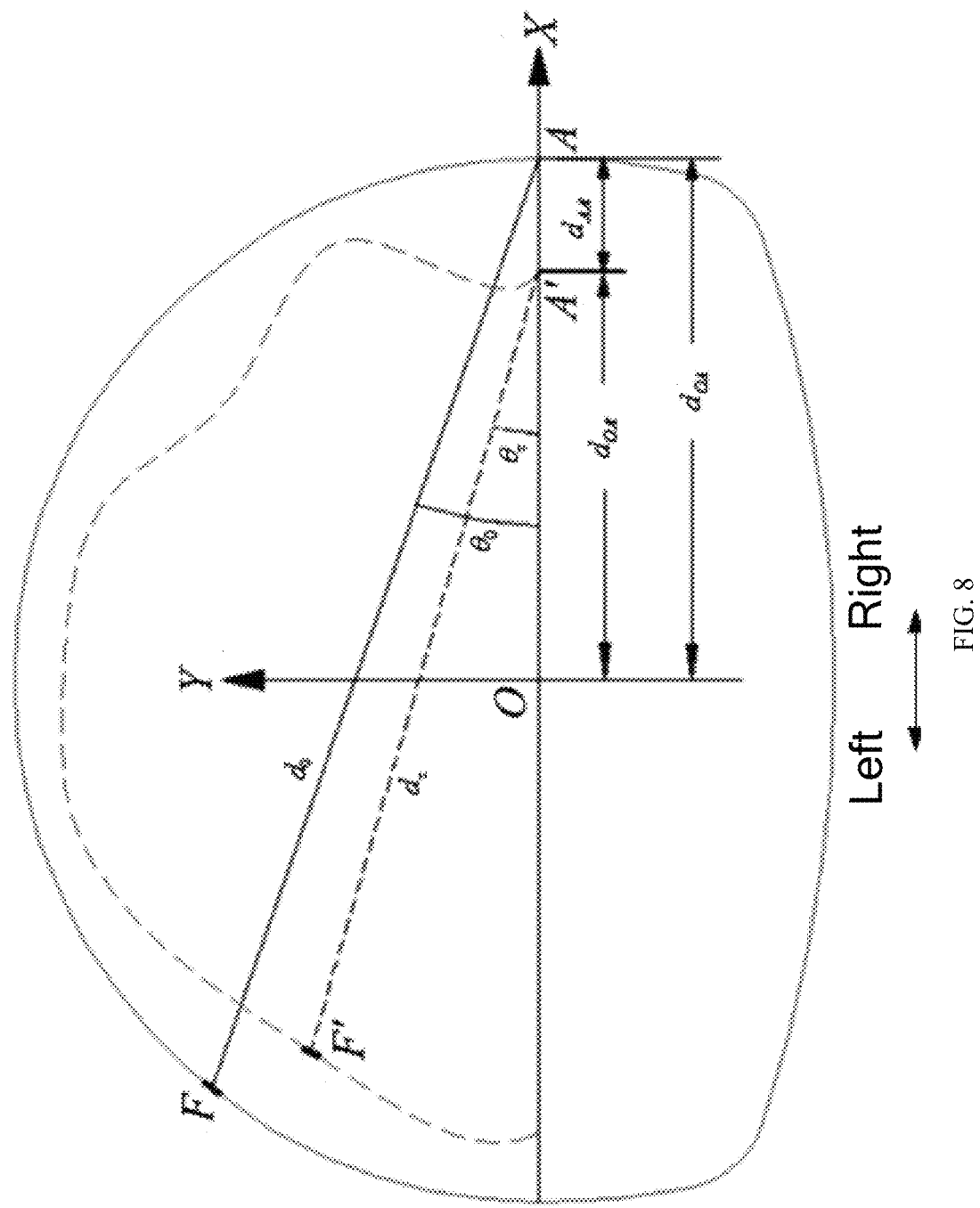
FIG. 8 is a schematic view of calculating a deformation offset according to the present invention.

As shown in FIGS. 7 and 8, it is assumed that the tunnel vault only has vertical displacement but not horizontal displacement, and the tunnel side wall only has horizontal displacement but not vertical displacement. Therefore, in a plane rectangular coordinate system with a point O as the origin, based on the derivation of geometric knowledge, the deformation offset FF' of each target is calculated as follows:

$$FF' = \sqrt{((d_0*\cos\theta_0 - d_{v,0}*\cos\theta_{v,0}) - (d_\tau*\cos\theta_\tau - d_{v,\tau}*\cos\theta_{v,\tau}))^2 + ((d_0*\sin\theta_0) - (d_\tau*\sin\theta_\tau))^2}$$

where, $d_0$ denotes the initial distance value corresponding to the target; $\theta_0$ denotes the initial target alignment angle corresponding to the target; $d_{v,0}$ denotes an initial distance value corresponding to the vault target; $\theta_{v,0}$ denotes an initial target alignment angle corresponding to the vault target; $d_\tau$ denotes the current distance value corresponding to the target; $\theta_\tau$ denotes the current target alignment angle corresponding to the target; $d_{v,\tau}$ denotes a current distance value corresponding to the vault target; and $\theta_{v,\tau}$ denotes a current target alignment angle corresponding to the vault target.

In the calculation of the deformation offset of the target, the present invention substitutes deformation offsets of opposite side walls, namely $(d_{v,0}*\cos\theta_{v,0}-d_{v,\tau}*\cos\theta_{v,\tau})$, to compensate for the mounting position of the laser ranging device, which is a deforming point. Therefore, the present invention can obtain a real and accurate deformation offset, thereby improving the reliability of the large deformation monitoring result of the surrounding rock of the tunnel. In addition, for the vault target, the calculation formula of the deformation offset may be simplified as: $(d_0*\sin\theta_0)-(d_\tau*\sin\theta_\tau)$. For the left wall target arranged on the left side wall or the right wall target arranged on the right side wall, the calculation formula of the deformation offset may be simplified as: $(d_0-d_{v,0}*\cos\theta_{v,0})-(d_\tau-d_{v,\tau}*\cos\theta_{v,\tau})=d_0-d_\tau-(d_{v,0}*\cos\theta_{v,0}-d_{v,\tau}*\cos\theta_{v,\tau})$, where $(d_{v,0}*\cos\theta_{v,0}-d_{v,\tau}*\cos\theta_{v,\tau})$ denotes the deformation offsets of opposite side walls.

Preferably, in order to enrich the results of large deformation of the surrounding rock of the tunnel, the tunnel deformation calculation stage further includes, but is not limited to: calculate the vault subsidence and the perimeter convergence based on the current target alignment angle, the current distance value, the initial target alignment angle and the initial distance value corresponding to the vault target. Specifically, as shown in FIGS. 7 and 8, based on the derivation of geometric knowledge, the vault subsidence $\Delta H$ and the perimeter convergence $\Delta L$ are calculated as follows:

$$\begin{cases} \Delta H = ((d_{v,0,left}*\sin\theta_{v,0,left}) - (d_{v,\tau,left}*\sin\theta_{v,\tau,left}) + \\ \quad (d_{v,0,right}*\sin\theta_{v,0,right}) - (d_{v,\tau,right}*\sin\theta_{v,\tau,right}))/2 \\ \Delta L = (d_{v,0,left}*\cos\theta_{v,0,left}) - (d_{v,\tau,left}*\cos\theta_{v,\tau,left}) + \\ \quad (d_{v,0,right}*\cos\theta_{v,0,right}) - (d_{v,\tau,right}*\cos\theta_{v,\tau,right}) \end{cases}$$

where, $d_{v,0,left}$ denotes an initial distance value corresponding to the vault target, calculated based on an automatic targeting and ranging result of the left laser ranging module; $\theta_{v,0,left}$ denotes an initial target alignment angle corresponding to the vault target, calculated based on the automatic targeting and ranging result of the left laser ranging module; $d_{v,\tau,left}$ denotes a current distance value corresponding to the vault target, calculated based on the automatic targeting and ranging result of the left laser ranging module; $\theta_{v,\tau,left}$ denotes a current target alignment angle corresponding to the vault target, calculated based on the automatic targeting and ranging result of the left laser ranging module; $d_{v,0,right}$ denotes an initial distance value corresponding to the vault target, calculated based on an automatic targeting and ranging result of the right laser ranging module; $\theta_{v,0,right}$ denotes an initial target alignment angle corresponding to the vault target, calculated based on the automatic targeting and ranging result of the right laser ranging module; $d_{v,\tau,right}$ denotes a current distance value corresponding to the vault target, calculated based on the automatic targeting and ranging result of the right laser ranging module; and $\theta_{v,\tau,right}$ denotes a current target alignment angle corresponding to the vault target, calculated based on the automatic targeting and ranging result of the right laser ranging module.

In addition, based on the derivation of geometric knowledge, after the deformation offset of each target is calculated, the vault subsidence ΔH and the perimeter convergence ΔL are calculated as follows:

$$\begin{cases} \Delta H = (FF'_{v,left} + FF'_{v,right})/2 \\ \Delta L = FF'_{left,sw} + FF'_{right,sw} \end{cases}$$

where, $FF'_{v,left}$ denotes a deformation offset corresponding to the vault target, calculated based on an automatic targeting and ranging result of the left laser ranging module; $FF'_{v,right}$ denotes a deformation offset corresponding to the vault target, calculated based on an automatic targeting and ranging result of the right laser ranging module; $FF'_{left,sw}$ denotes a deformation offset corresponding to a left wall target arranged on the left side wall; and $FF'_{right,sw}$ denotes a deformation offset corresponding to a right wall target arranged on the right side wall.

Preferably, in order to enrich the results of large deformation of the surrounding rock of the tunnel, after calculating the deformation offset of each target, the method further includes: obtain a contour deformation map of the tunnel for reflecting the large deformation of the surrounding rock of the tunnel by fitting based on deformation offsets corresponding to the vault target, all the left wall targets and all the right wall targets. For further optimization, the time stamp information of the laser ranging may also be added in the fitting process, so as to obtain a dynamic graph of the deformation of the tunnel contour.

In addition, the specific steps of the tunnel deformation calculation stage may also be executed by a cloud server or a host computer communicating the cloud server. That is, after the automatic targeting and ranging task is completed, the measured current target alignment angle and the current distance value may be bound and uploaded together with the unique identification information of the target and the laser ranging timestamp information to the cloud server. The specific steps and algorithms of the tunnel deformation calculation stage are executed by the cloud server/host computer, and the monitoring results of large deformation of the surrounding rock of the tunnel are obtained.

Based on the automatic targeting and ranging system, the present invention provides a solution for monitoring large deformation of a surrounding rock of a tunnel. The solution includes: acquire, by a camera module, a target monitoring image; identify a center image position in the target monitoring image; perform, by a laser ranging module, an automatic targeting and ranging task according to the center image position; and calculate a deformation offset of each target of left wall targets, right wall targets and a vault target based on an automatic targeting and ranging result corresponding to the target. The present invention solves the problem that a laser ranging device fails to measure a target at a fixed angle, and obtains a real and accurate deformation offset, greatly improving the reliability of the large deformation monitoring result of the surrounding rock of the tunnel. In addition, in the calculation of the deformation offset of the target, the present invention substitutes deformation offsets of opposite side walls to compensate for the mounting position of the laser ranging device, which is a deforming point. Therefore, the present invention can obtain a real and accurate deformation offset, thereby improving the reliability of the large deformation monitoring result of the surrounding rock of the tunnel.

The embodiments described above are merely illustrative. Units described as separate components may or may not be physically separated. Components displayed as units may or may not be physical units, that is, the components may be located in one place, or may be distributed to multiple network units. Some or all of the units may be selected according to actual needs to achieve the objectives of the solutions of the embodiments. Those of ordinary skill in the art may understand and implement the embodiments without creative efforts.

The above embodiments are only used to explain the technical solutions of the present invention, and are not intended to limit the present invention. Although the present invention is described in detail with reference to the above embodiments, those of ordinary skill in the art should understand that they may still modify the technical solutions described in the above embodiments, or make equivalent substitutions on some technical features therein. These modifications or substitutions do not make the essence of the corresponding technical solutions deviate from the spirit and scope of the technical solutions of the embodiments of the present invention.

Finally, it should be noted that the present invention is not limited to the above optional implementations, and anyone may derive other products in various forms under the enlightenment of the present invention. The above specific implementations should not be construed as limiting the protection scope of the present invention, and the protection scope of the present invention should be defined by the claims. Moreover, the description may be used to interpret the claims.

What is claimed is:

1. A method for monitoring large deformation of a surrounding rock of a tunnel based on an automatic targeting and ranging system, wherein the automatic targeting and ranging system comprises a left camera module, a left laser ranging module, a plurality of left wall targets, a right camera module, a right laser ranging module, a plurality of right wall targets and a vault target; the left camera module and the left laser ranging module are bound on a left side wall of a cross section of the tunnel and are rotatable counterclockwise synchronously on the cross section of the tunnel; the plurality of left wall targets are spaced apart on a left wall of the cross section of the tunnel; the right camera module and the right laser ranging module are bound on a right side wall of the cross section of the tunnel and are rotatable synchronously clockwise on the cross section of the tunnel; the plurality of right wall targets are spaced apart on a right wall of the cross section of the tunnel; and the vault target is provided at a vault position of the cross section of the tunnel;

the method for monitoring the large deformation of the surrounding rock of the tunnel comprises an automatic targeting and ranging stage and a tunnel deformation calculation stage;

wherein for each target of the plurality of left wall targets, the plurality of right wall targets and the vault target, the automatic targeting and ranging stage comprises the following steps:

rotating a camera module and a laser ranging module corresponding to a target from a horizontal position, wherein the camera module is the right camera module corresponding to the plurality of left wall targets or the vault target, and the laser ranging module is the right laser ranging module corresponding to the plurality of left wall targets or the vault target; alternatively, the camera module is the left camera module corresponding to the plurality of right wall targets or the vault target, and the laser ranging module is the left laser ranging module corresponding to the plurality of right wall targets or the vault target;

when the camera module and the laser ranging module are rotated to an initial target alignment angle corresponding to the target, acquiring, by the camera module, a target monitoring image comprising a target image, wherein the initial target alignment angle refers to a rotation angle of rotating the laser ranging module from the horizontal position to allow the laser ranging module to be aligned with the target when the target is arranged;

determining a center image position of the target in the target monitoring image;

adjusting rotation angles of the camera module and the laser ranging module according to the center image position, to allow the laser ranging module to be aligned with the target;

calculating a current target alignment angle according to the initial target alignment angle and adjusted rotation angles; and acquiring, by the laser ranging module, a current distance value from the laser ranging module to the target;

wherein the tunnel deformation calculation stage comprises: calculating a deformation offset of each target of the plurality of left wall targets, the plurality of right wall targets and the vault target according to the current target alignment angle, the current distance value, the initial target alignment angle and an initial distance value corresponding to the target, wherein the initial distance value refers to a distance value from the laser ranging module to the target first acquired by the laser ranging module in an alignment attitude when the target is arranged;

wherein the step of calculating the deformation offset of each target of the plurality of left wall targets, the plurality of right wall targets and the vault target according to the current target alignment angle, the current distance value, the initial target alignment angle and the initial distance value corresponding to the target comprises:

calculating the deformation offset FF' of each target as follows:

$$FF' = \sqrt{((d_0 * \cos\theta_0 - d_{v,0} * \cos\theta_{v,0}) - (d_\tau * \cos\theta_\tau - d_{v,\tau} * \cos\theta_{v,\tau}))^2 + ((d_0 * \sin\theta_0) - (d_\tau * \sin\theta_\tau))^2}$$

wherein, $d_0$ denotes the initial distance value corresponding to the target; $\theta_0$ denotes the initial target alignment angle corresponding to the target; $d_{v,0}$ denotes an initial distance value corresponding to the vault target; $\theta_{v,0}$ denotes an initial target alignment angle corresponding to the vault target; $d_\tau$ denotes the current distance value corresponding to the target; $\theta_\tau$ denotes the current target alignment angle corresponding to the target; $d_{v,\tau}$ denotes a current distance value corresponding to the vault target; and $\theta_{v,\tau}$ denotes a current target alignment angle corresponding to the vault target.

2. The method for monitoring the large deformation of the surrounding rock of the tunnel according to claim 1, wherein the step of determining the center image position of the target in the target monitoring image comprises:

scaling the target monitoring image to a size suitable to be input into a convolutional neural network (CNN) to obtain a scaled target monitoring image;

inputting the scaled target monitoring image into the CNN, and extracting feature information of the target monitoring image through an interaction of a convolutional layer, a pooling layer and an activation function of the CNN;

transmitting the feature information to a region proposal network (RPN), preliminarily positioning a target image feature through the RPN, and generating a candidate identification region comprising the target image;

transmitting the candidate identification region and the feature information to a region of interest (ROI) pooling layer, and extracting feature information in the candidate identification region through the ROI pooling layer; and inputting the feature information in the candidate identification region into a fully connected layer, and positioning a center image through the fully connected layer to obtain the center image position.

3. The method for monitoring the large deformation of the surrounding rock of the tunnel according to claim 2, wherein after scaling the target monitoring image to the size suitable to be input into the CNN, the method further comprises:

uploading the scaled target monitoring image to a cloud server; and processing, by the cloud server, the scaled target monitoring image sequentially through the CNN, the RPN, the ROI pooling layer and the fully connected layer to obtain the center image position.

4. The method for monitoring the large deformation of the surrounding rock of the tunnel according to claim 1, wherein after calculating the deformation offset of each target, the method further comprises:

calculating a vault subsidence ΔH and a perimeter convergence ΔL as follows:

$$\begin{cases} \Delta H = (FF'_{v,left} + FF'_{v,right})/2 \\ \Delta L = FF'_{left,sw} + FF'_{right,sw} \end{cases}$$

wherein, $FF'_{v,left}$ denotes a deformation offset corresponding to the vault target, calculated based on an automatic targeting and ranging result of the left laser ranging module; $FF'_{v,right}$ denotes a deformation offset corresponding to the vault target, calculated based on an automatic targeting and ranging result of the right laser ranging module; $FF'_{left,sw}$ denotes a deformation offset corresponding to a left wall target arranged on the left side wall; and $FF'_{right,sw}$ denotes a deformation offset corresponding to a right wall target arranged on the right side wall.

5. The method for monitoring the large deformation of the surrounding rock of the tunnel according to claim 1, wherein the tunnel deformation calculation stage further comprises: calculating a vault subsidence and a perimeter convergence based on a current target alignment angle, a current distance value, an initial target alignment angle and an initial distance value corresponding to the vault target.

6. The method for monitoring the large deformation of the surrounding rock of the tunnel according to claim 5, wherein the step of calculating the vault subsidence and the perimeter convergence based on the current target alignment angle, the current distance value, the initial target alignment angle and the initial distance value corresponding to the vault target comprises:

calculating the vault subsidence ΔH and the perimeter convergence ΔL as follows:

$$\begin{cases} \Delta H = ((d_{v,0,left} * \sin\theta_{v,0,left}) - (d_{v,\tau,left} * \sin\theta_{v,\tau,left}) + \\ (d_{v,0,right} * \sin\theta_{v,0,right}) - (d_{v,\tau,right} * \sin\theta_{v,\tau,right}))/2 \\ \Delta L = (d_{v,0,left} * \cos\theta_{v,0,left}) - (d_{v,\tau,left} * \cos\theta_{v,\tau,left}) + \\ (d_{v,0,right} * \cos\theta_{v,0,right}) - (d_{v,\tau,right} * \cos\theta_{v,\tau,right}) \end{cases},$$

wherein, $d_{v,0,left}$ denotes an initial distance value corresponding to the vault target, calculated based on an automatic targeting and ranging result of the left laser ranging module; $\theta_{v,0,left}$ denotes an initial target alignment angle corresponding to the vault target, calculated based on the automatic targeting and ranging result of the left laser ranging module; $d_{v,\tau,left}$ denotes a current distance value corresponding to the vault target, calculated based on the automatic targeting and ranging result of the left laser ranging module; $\theta_{v,\tau,left}$ denotes a current target alignment angle corresponding to the vault target, calculated based on the automatic targeting and ranging result of the left laser ranging module; $d_{v,0,right}$ denotes an initial distance value corresponding to the vault target, calculated based on an automatic targeting and ranging result of the right laser ranging module; $\theta_{v,0,right}$ denotes an initial target alignment angle corresponding to the vault target, calculated based on the automatic targeting and ranging result of the right laser ranging module; $d_{v,\tau,right}$ denotes a current distance value corresponding to the vault target, calculated based on the automatic targeting and ranging result of the right laser ranging module; and $\theta_{v,\tau,right}$ denotes a current target alignment angle corresponding to the vault target, calculated based on the automatic targeting and ranging result of the right laser ranging module.

7. The method for monitoring the large deformation of the surrounding rock of the tunnel according to claim 1, wherein after calculating the deformation offset of each target, the method further comprises:

obtaining a contour deformation map of the tunnel for reflecting the large deformation of the surrounding rock of the tunnel by fitting based on deformation offsets corresponding to the vault target, the plurality of left wall targets and the plurality of right wall targets.

8. The method for monitoring the large deformation of the surrounding rock of the tunnel according to claim 1, wherein the automatic targeting and ranging system further comprises a control board, a left servo motor and a right servo motor; and the control board communicates with output ends of the left camera module, the left laser ranging module, the right camera module and the right laser ranging module, respectively;

the left servo motor is arranged on the left side wall of the cross section of the tunnel, and communicates with the control board, so as to drive, under a control of the control board, the left camera module and the left laser ranging module to rotate synchronously counterclockwise on the cross section of the tunnel; and the right servo motor is arranged on the right side wall of the cross section of the tunnel, and communicates with the control board, so as to drive, under the control of the control board, the right camera module and the right laser ranging module to rotate synchronously clockwise on the cross section of the tunnel.

9. The method for monitoring the large deformation of the surrounding rock of the tunnel according to claim 1, wherein each of the plurality of left wall targets, the plurality of right wall targets and the vault target adopts a reflective sheet with a square structure; and a green luminous paint layer is coated on a reflective surface of the reflective sheet, and a center position of the green luminous paint layer is provided with a circular reflective surface exposure hole.

* * * * *